United States Patent [19]

Twist et al.

[11] Patent Number: 4,744,930

[45] Date of Patent: May 17, 1988

[54] EXTRUSION CONTROL

[75] Inventors: Reginald J. Twist, Cuddington; James H. Hughes, Upton, both of England

[73] Assignee: BICC Public Limited Company, London, England

[21] Appl. No.: 826,314

[22] Filed: Feb. 5, 1986

[30] Foreign Application Priority Data

Feb. 28, 1985 [GB] United Kingdom ............... 8505199

[51] Int. Cl.⁴ .................. B29C 47/02; B29C 47/92; B29C 67/20
[52] U.S. Cl. .................. 264/40.2; 264/40.1; 264/40.4; 264/40.6; 264/40.7; 264/45.9; 264/46.7; 264/174; 425/140; 425/148
[58] Field of Search ............ 264/40.1, 40.4, 40.5, 264/40.6, 40.7, 45.9, 46.7, 174, 40.2; 425/140, 148

[56] References Cited

U.S. PATENT DOCUMENTS

| | | | |
|---|---|---|---|
| 3,624,025 | 11/1971 | Twist | 264/40.4 |
| 3,733,160 | 5/1973 | Neil | 425/148 X |
| 3,890,078 | 6/1975 | Straumanis | 264/40.7 X |
| 3,904,338 | 9/1975 | Straumanis | 264/40.7 X |
| 4,088,721 | 5/1978 | Apicella | 264/40.4 |
| 4,097,566 | 6/1978 | Bertin et al. | 264/40.7 |
| 4,152,380 | 5/1979 | Graves et al. | 264/40.7 X |
| 4,156,913 | 5/1979 | Apicella | 264/40.7 X |
| 4,168,290 | 9/1979 | Giles | 264/40.1 X |
| 4,209,476 | 6/1980 | Harris | 264/40.4 |
| 4,233,255 | 11/1980 | Moon | 264/40.4 |
| 4,244,897 | 1/1981 | Moon | 425/140 X |
| 4,425,289 | 6/1984 | Lee et al. | 264/40.1 |
| 4,510,104 | 4/1985 | Weaver et al. | 264/40.7 |
| 4,550,002 | 10/1985 | Uhland et al. | 264/40.7 |
| 4,551,289 | 11/1985 | Schwab et al. | 264/40.1 X |
| 4,592,881 | 6/1986 | Kyriakts | 425/140 |

FOREIGN PATENT DOCUMENTS

| | | | |
|---|---|---|---|
| 200214 | 3/1983 | German Democratic Rep. | 264/40.1 |
| 1217187 | 12/1970 | United Kingdom | 264/40.4 |
| 1305050 | 1/1973 | United Kingdom | . |
| 2087100A | 5/1982 | United Kingdom | . |
| 0610185 | 5/1978 | U.S.S.R. | 264/40.1 |

OTHER PUBLICATIONS

Brand et al., Computerize Your Entire Extrusion System, 1972 Feb., Plastics Technology, pp. 37 to 39.

Primary Examiner—Jeffery Thurlow
Assistant Examiner—Leo B. Tentoni
Attorney, Agent, or Firm—Parkhurst & Oliff

[57] ABSTRACT

An extrusion process is controlled by feeding the material to be extruded from a supply station (5) to an extruder (1) and repeatedly weighing the supply station to calculate the throughput of the extruder. The initial line speed necessary to produce a predetermined weight/meter of extrudate is calculated and the line speed is adjusted accordingly. Subsequently, the throughput and the line speed are increased simultaneously, such that the weight/meter is maintained substantially constant until any one of a plurality of parameters such as line speed, screw speed, motor load current, extrudate temperature, melt pressure, etc reaches a predetermined maximum value. Thereafter either the line speed or extruder throughput is adjusted such as to maintain the weight/meter of the extrudate substantially constant at the desired value.

8 Claims, 4 Drawing Sheets

EXTRUSION CONTROL

BACKGROUND AND SUMMARY OF THE INVENTION

This invention relates to a method and apparatus for controlling an extrusion process such that the weight/meter of extrudate can be accurately controlled.

The invention is especially concerned with the extrusion of a tubular covering of rubber or thermoplastics material on to a core, in which the linear speed of the extrudate as finally formed is equal to the speed at which the core passes through the machine. When extruding sections not formed as tubular coverings on a core, the linear speed of travel of the extrudate as finally formed is considered to be the speed at which it is taken up, e.g. by a capstan, an endless belt haul-off, or a take-up drum, from the extrusion machine after it has been cooled.. This speed and the core speed when tubular coverings are being formed on a core will herein each be referred to generically as the "line speed".

It is known to attempt to control the weight/meter of extrudate on a cable by measuring the diameter of a cable and varying the extrusion process to attempt to maintain the diameter constant. This suffers from the disadvantage that the diameter of a cable is not easy to accurately determine until the extrudate has been cooled. Furthermore where a core of non-circular cross-section is employed the diameter of the cable produced may not be an accurate reflection of the weight/meter of extrudate applied thereto.

It is therefore proposed to provide an extrusion process in which the weight/meter of extrudate can be more accurately controlled.

Accordingly a method of controlling an extrusion process comprises the steps of feeding the material to be extruded from a supply station to an extruder;

repeatedly weighing the supply station to calculate the through-put of the extruder;

calculating the initial line speed necessary to produce a predetermined weight/meter of extrudate;

adjusting the line speed directly to said initial line speed;

subsequently increasing the throughput of the extruder and the line speed simultaneously, such that the weight/meter of the extrudate is maintained substantially constant, until any one of a plurality of measured parameters reaches a predetermined maximum value; and thereafter adjusting the line speed or extruder throughput in response to the calculated throughput of the extruder such as to maintain the weight/meter of the extrudate substantially constant at said predetermined weight/meter.

Conveniently the supply station is weighed by a load cell, typically by being freely suspended therefrom. Repeated measurement of the combined weight of the supply station and material therein will allow calculation of the weight of material leaving the supply station and hence the throughput of the extruder. Measurement of the weight of material entering the extruder is a direct indication of the performance of the extruder. Alternative systems which monitor the volume of material entering the extruder are inherently less accurate due to the property that the flow of material from the supply station is not regular.

The supply station is preferably a container in which the material to be extruded is held. Alternatively, where the material to be extruded is in strip form rather than in the form of granules, powder etc, the supply station is conveniently a platform such as a pallet or the like.

It is envisaged that the feed to the extruder will be such that it is choke fed and the throughput of the extruder varied by varying the screw speed thereof. However it is equally conceivable that the extruder may be starve fed and its throughput controlled, additionally or alternatively to the screw speed, by varying the amount of material fed to the extruder. It will be appreciated that whether the extruder is choke fed and its throughput is monitored, or whether the extruder is starve fed and its throughput is metered, repeated weighing of the supply station will allow the throughput to be calculated.

Conveniently the throughput of the extruder and the line speed are simultaneously increased in an incremental manner, separated by periods in which only one of the throughput or line speed is varied such as to maintain the weight/meter of the extrudate substantially at the predetermined weight/meter. This incremental increase allows any discrepancy which may be introduced into the weight/meter of the extrudate by the simultaneous increase of the throughput and line speed to be corrected. Each increment is preferably preset to subsist for a predetermined time period. Additionally the time periods of respective increments conveniently vary according to a preset progression. For example a decreasing incremental length is envisaged such that more frequent corrective action is taken at relatively higher line speeds.

Conveniently the method includes the additional step of reducing the extruder throughput and the line speed, once at least one of said measured parameters has reached its predetermined maximum value, until said at least one parameter again falls below the predetermined maximum value. This "backing-off" of the production rate is to avoid a situation in which the production rate is maintained whilst said parameter continues to rise above its predetermined maximum value. By reducing the throughput and line speed until the parameter once again falls below maximum, the possibility of the parameter considerably overshooting its maximum is removed.

The measured parameters conceivably include the line speed, the screw speed of the extruder, the load current of the motor driving the extruder screw, the melt pressure at the extruder head and the temperature of the extrudate emerging from the extruder. Other parameters may be measured and monitored where appropriate to the manufacturing process.

The method of the present invention is particularly suited to the production of variable density extrudate. By the term variable density extrudate is herein meant material which is expanded by a gas, normally nitrogen, to form an extrudate which is foamed, or is solid material which has cavities or segments therein. The gas is either injected into the extrudate or is produced chemically by the addition of a gas producing compound to the material to be extruded. The expansion continues until the extrudate is stabilized by cooling at which point the gas produced cavities are "frozen" into the extrudate.

Accordingly the method conveniently includes the steps of measuring at least one additional parameter which is either a suitable dimension or the capacitance of the stabilized extrudate, and adjusting the temperature profile of the extrudate in response to said measured additional parameter in order to maintain said additional parameter substantially constant. The suitable dimension is typically the diameter of the extrudate. The temperature profile of the extrudate is conveniently adjusted by changing the longitudinal position of a cooling means, adapted to stabilize the extrudate. The cooling means is conceivably a quenching bath containing coolant such as water. Alternatively cooling is achieved by means of one or more jets adapted to spray air, water or other coolant on to the extrudate.

The invention further resides in an extrusion apparatus controlled by the method described herein. In particular the extrusion apparatus comprises an extruder; a supply station adapted to support material to be extruded; supply means adapted to feed the material to the extruder; weighing means for repeated weighing of the supply station; drive means for controlling the line speed; means for measuring the line speed; sensors for sensing a plurality of parameters; and electronic processing means adapted to:

I. receive repeated signals from the weighing means and calculate the throughput of the extruder, II. calculate an initial line speed necessary to produce a predetermined weight/meter of extrudate, III. supply signals to the drive means to adjust the line speed to said initial line speed, IV. compare the plurality of sensed parameters against predetermined maximum values for these parameters, and if all are below said maximum values supply signals to the drive means and to the extruder to increase the line speed and the throughput of the extruder simultaneously, such that the weight/meter of the extrudate is maintained substantially constant, and V. supply signals to the drive means, once at least one of said sensed parameters is at its maximum value, to adjust the line speed or extruder throughput in response to the calculated throughput of the extruder such as to maintain the weight/meter of the extrudate substantially constant at said predetermined weight/meter.

Conveniently the electronic processing means is a microprocessor or microcomputer.

BRIEF DESCRIPTION OF THE DRAWINGS

The invention will now be further described, by way of example only, with reference to the accompanying drawings in which.

DESCRIPTION OF THE PREFERRED EMBODIMENT

Figure 1:
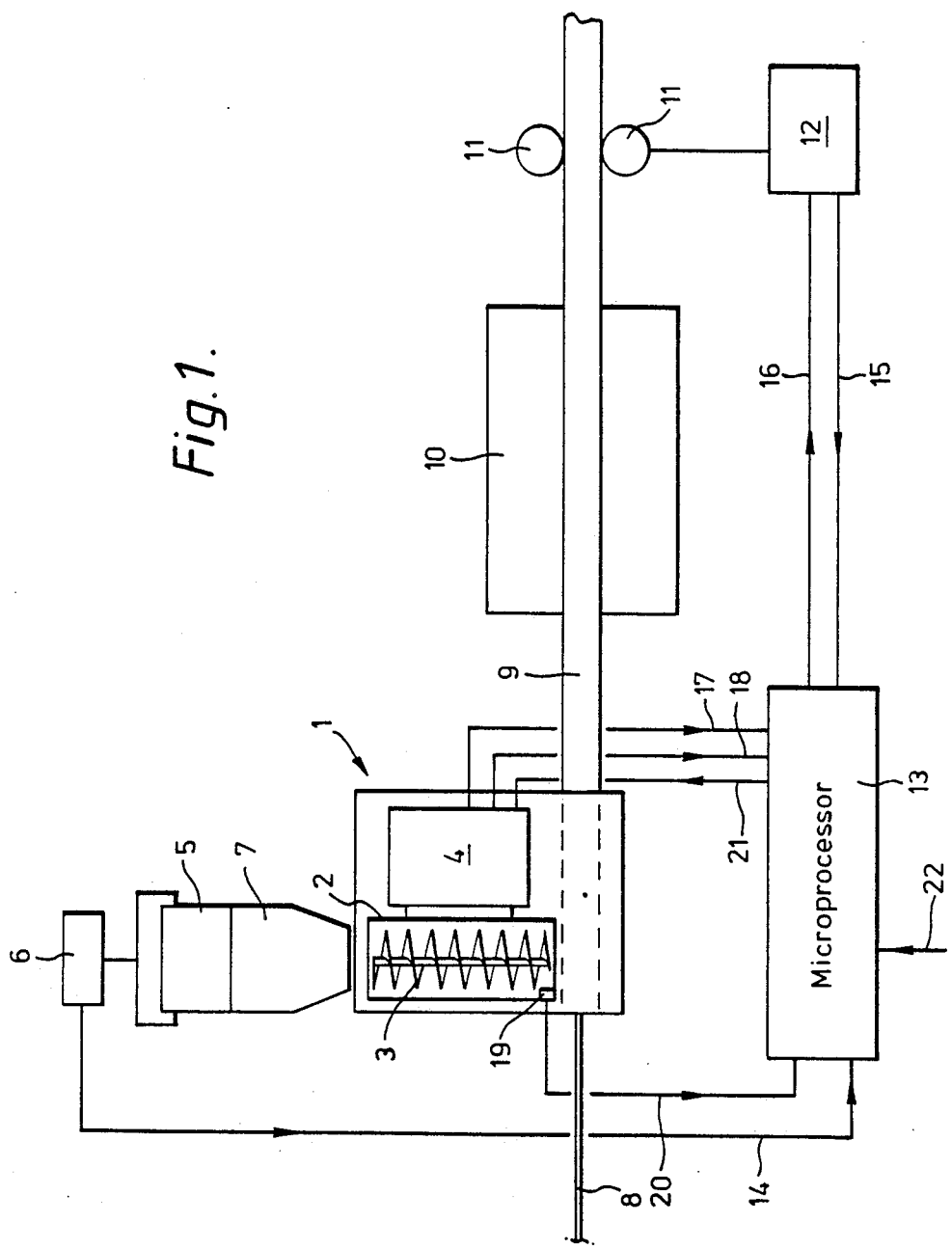
FIG. 1 is a schematic diagram of extrusion apparatus according to the present invention.

Referring to FIG. 1 an extruder shown generally at 1 includes a heated barrel 2 within which is an extruder screw 3 driven by a motor 4. A supply station in the form of a hopper 5 is freely suspended from a load cell 6. The hopper 5 feeds thermoplastic material to be extruded in the form of PVC granules 7 into the barrel 2. A metallic core 8 is fed into the extruder 1 and the core is coated with an extrudate to form a cable 9. The cable 9 emerging from the extruder is fed to a cooling bath 10 and a pair of rollers 11 driven by a motor 12 hauls off the coated cable 9 onto a winding apparatus (not shown).

A microprocessor 13 receives electronic signals from the load cell 6 via line 14. A plurality of parameters are sensed and fed to the microprocessor 13. For example, the microprocessor is in communication with the haul-off motor 12 by means of lines 15 and 16 in order to monitor and control the haul-off line speed.

Additionally the microprocessor 13 is in communication with the motor 4 by means of line 21 and receives signals therefrom via lines 17 and 18 regarding the screw speed and motor load current respectively. Finally a temperature sensor 19 senses the extrudate melt temperature and sends electronic signals to the microprocessor via line 20.

Figure 2:
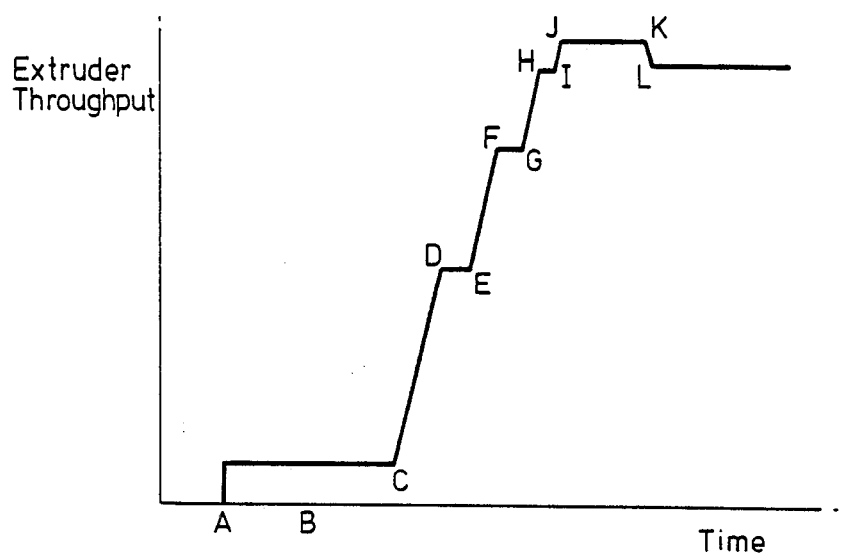
FIG. 2 is a graph of extruder throughput against time for a typical production run of the apparatus of FIG. 1.
Figure 3:
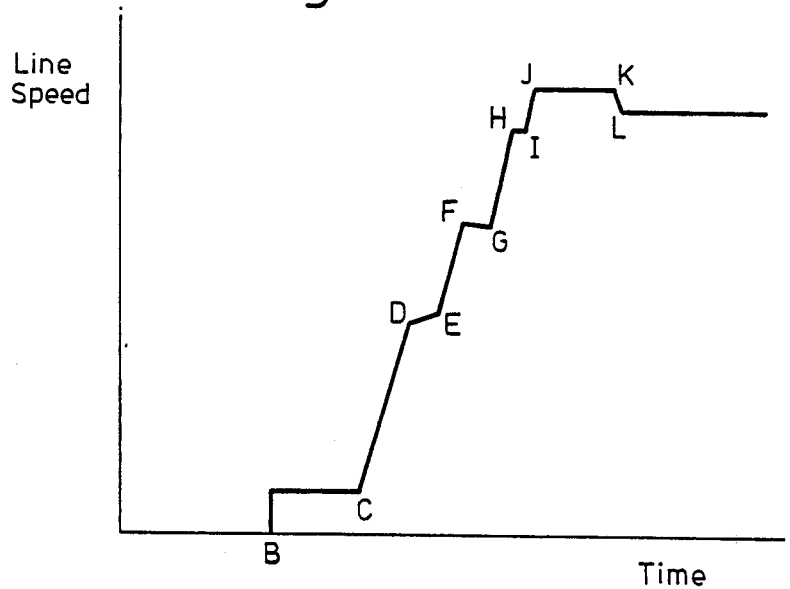
FIG. 3 is a graph of line speed against time for the production run of FIG. 2.

The setting up of an extrusion run will now be described with particular reference to FIGS. 2 and 3. Data regarding the desired weight/meter of the extrudate and the maximum values for the line speed, melt temperature, screw speed and motor load current are input to the microprocessor 13 via input line 22.

At time A the extruder 1 is started or accelerated up from 'tick over' to run at a relatively low 'initial' throughput. At this time the rollers 11 are not running and the line speed is hence zero. The microprocessor 13 receives measurements from the load cell 6 via line 14, determines the throughput of the extruder at 'initial throughput' and calculates the line speed required to achieve the desired weight/meter as previously input. It sends signals via line 16 to the haul-off motor 12 to activate the rollers 11 at the calculated line speed as shown at time B. The cable is therefore immediately produced at the desired weight/meter thereby reducing the amount of scrap cable commonly produced at the start of a production run.

At time C the microprocessor starts to increase the production rate. It sends a signal via line 21 to the motor 4 to increase the screw speed to correspondingly increase the extruder throughout. Simultaneously the microprocessor 13 sends a signal via line 16 to the motor 12 to increase the line speed by means of rollers 11.

After a preset time increment C-D the microprocessor 13 sends signals to the motors 4 and 12 to halt the increase in production rate. It again calulates the throughput of the extruder from the measurements of the load cell 6 and sends signals to the motor 12 to adjust the line speed to correct any discrepancy in the weight/meter of extrudate. The increase in production rate is further continued in increments E-F, G-H etc. with correcting intervals F-G, H-I therebetween.

The microprocessor 13 continuously monitors the other parameters against their maximum values input previously via line 22. At time J one of the parameters, for example the extrudate melt temperature as measured by sensor 19, reaches its predetermined maximum value. The microprocessor therefore again sends signals halting the increase in the production rate. From time K the microprocessor starts to decrease the extruder throughput and line speed until at time L the melt temperature as sensed by sensor 19 again falls below its predetermined maximum value. The production run then continues at this production rate until a signal is given to end the run.

By increasing the production rate until one of the parameters reaches its maximum, the production run is effectively run at its optimum rate. Thereafter, optimization of the process is maintained by maintaining constant the weight/meter of the extrudate.

It will be seen that the production run is controlled such that, even when the rate of production is being scaled up, the weight/meter of extrudate of the cable produced is never more than a small degree from the desired value. The degree of accuracy required during the sealing up of a production run can be achieved by setting the lengths of the increments in which production is increased.

It will be appreciated that two or more extrusion machines as described herein may operate in tandem, the output of one machine being used as the core 8 to be fed to another machine. In particular, an arrangement is envisaged in which several such machines each extrude an insulating covering onto a wire, the wires from the machines each being fed to a single secondary extrusion machine which combines them within an extruded outer sheath to form a cable. Where two or more extrusion machines run in tandem, the line speed must be the same for each. Therefore where the line speed is tied to the throughput of one extruder, any adjustments to maintain the desired weight/meter at other extrusion machines must be carried out by varying the extruder throughput.

Figure 4:
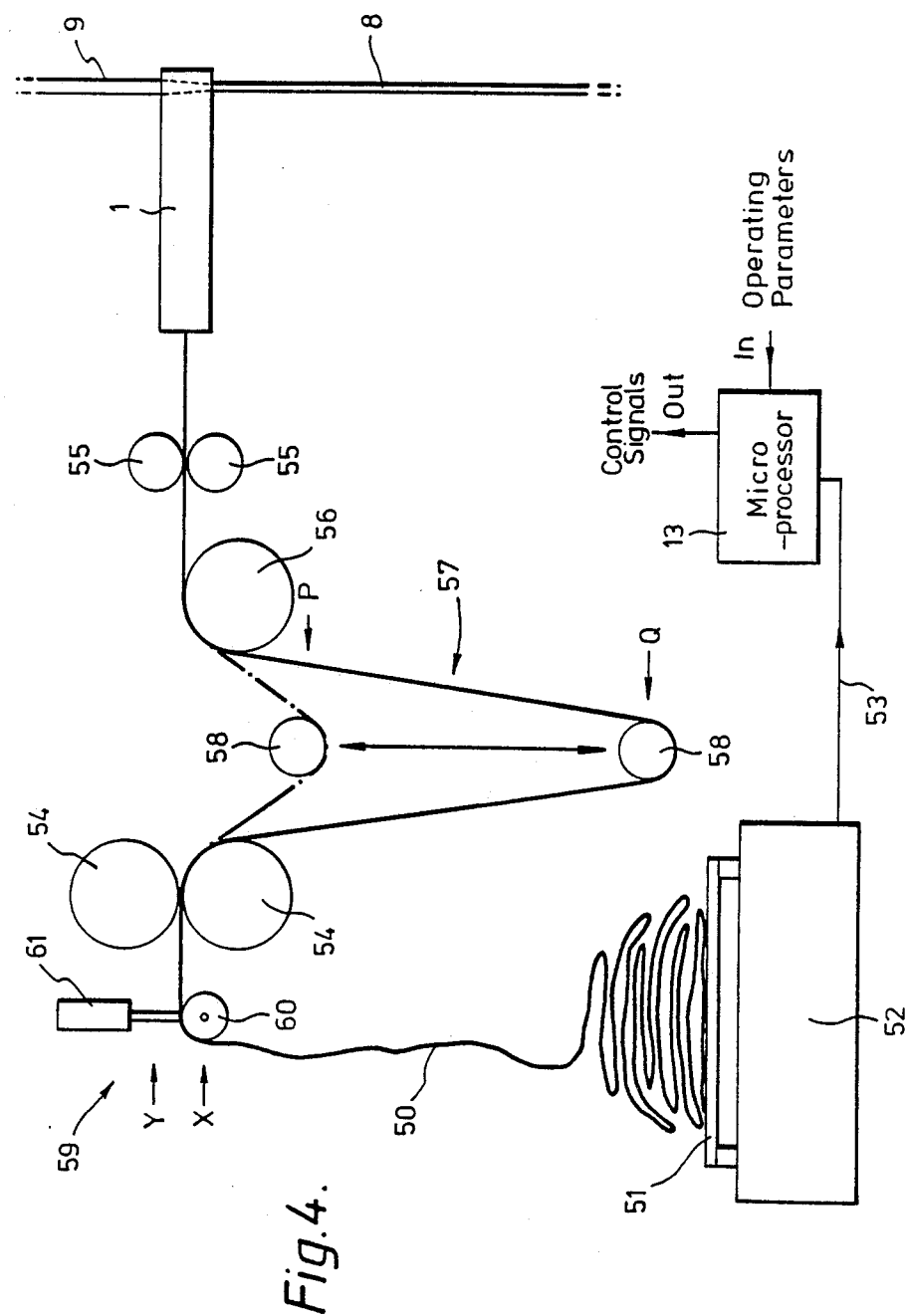
FIG. 4 is a schematic diagram of the apparatus of FIG. 1 as modified to accept feed material in strip form.

FIG. 4 shows extrusion apparatus equivalent to that of FIG. 1, which is capable of accepting feed material in the form of a strip 50. The strip 50 is supported on a pallet 51, itself mounted on a gyroscopic weighing device 52. Signals from the weighing device 52 are fed to the microprocessor 15 via line 53.

The strip 50 is fed to the extruder 1 by two sets of driven pulley wheels, 54 and 55, between which is an unpowered pulley wheel 56 and an accumulator shown generally at 57. The pulley wheels 54 are driven at a faster rate than the wheels 55 such that the strip feed is picked up from the pallet 51 faster than it is fed to the extruder, the additional strip material being temporarily stored in the accumulator 57.

The accumulator consists of an accumulator pulley 58 freely movable between two positions P and O. At position P the drive to the pulley wheels 54 is switched in and strip 50 is taken up from the pallet and stored in the accumulator, by the downward movement of the pulley 58. When the accumulator pulley 58 reaches position Q the drive to the pulleys 54 is switched out, halting the take up of strip from the pallet 51 and allowing the weighing device 52 to make a static measurement of the weight of the strip material thereon. The strip is still fed to the extruder 1 by the pulley wheels 55 from the stored strip in the accumulator 57. When the accumulator pulley 58 reaches position P, the drive to pulley wheels 54 is switched in again and the cycle is repeated. It will be seen from the above that a static weighing measurement can thus be achieved, whilst maintaining a continuous feed to the extruder 1.

Positioned between the pulley wheels 54 and the strip 50 on the pallet 51 is a tension release device seen generally at 59. This device comprises an unpowered pulley wheel 60 movable by means of a hydraulic cylinder 61 between two positions X and Y. When the drive to the pulley wheels 54 is switched in, the tension pulley 60 is moved to position Y. When the accumulator 57 is full and the drive to pulley wheels 54 is switched out, the tension pulley 60 is moved downwardly to position X, thereby eliminating any tension in the strip 50. This allows the gyroscopic weighing device 52 to make a true measurement of the static weight of the strip 50 on the pallet 51. As before, this repeated weighing of the input to the extruder 1 allows the microprocessor 13 to control accurately the weight/meter of extrudate applied to the core 8.

Figure 5:
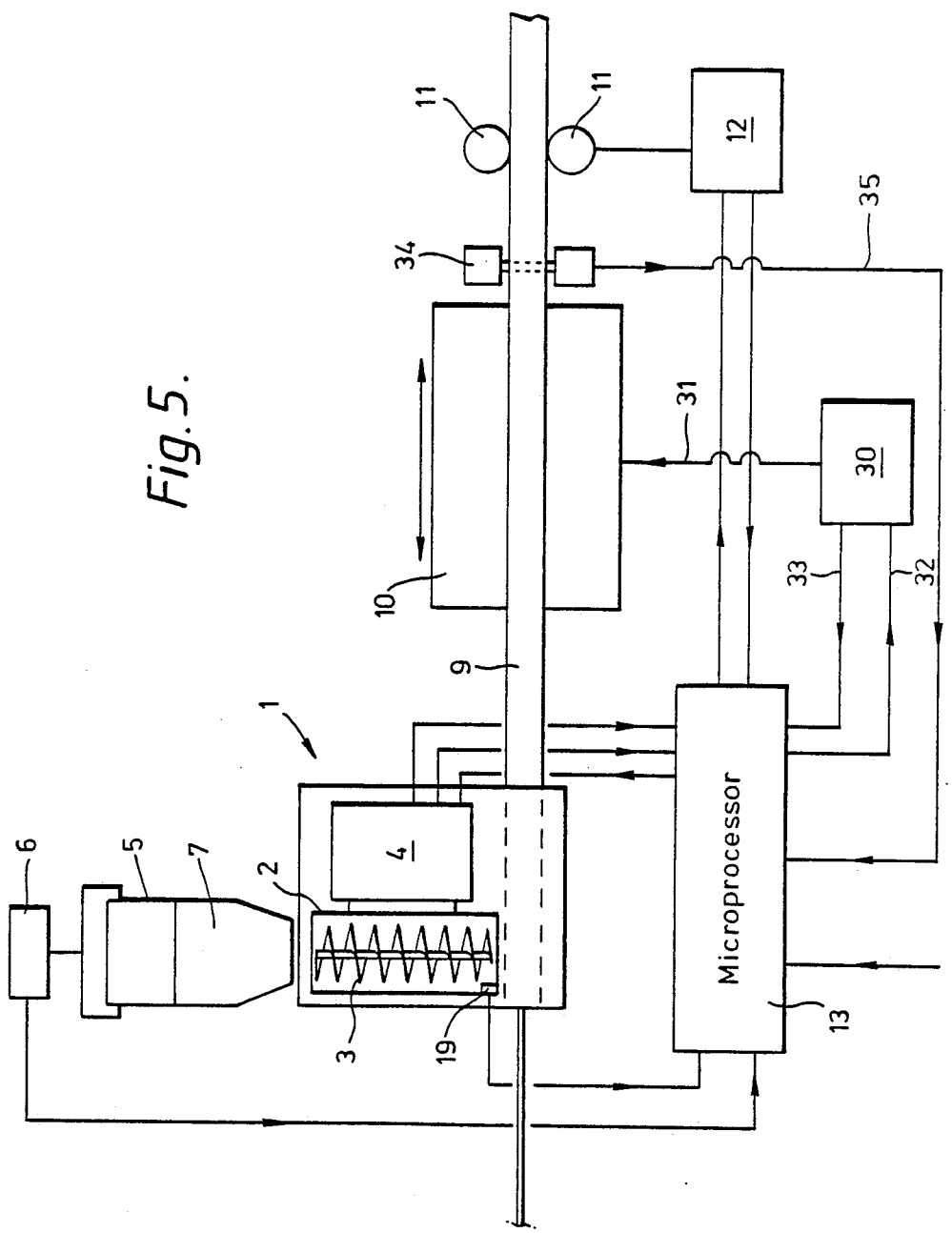
FIG. 5 is a schematic diagram of the apparatus of FIG. 1 as modified to produce variable density extrudate.

With reference to FIG. 5 an apparatus is shown suitable for the extrusion of a variable density extrudate. The apparatus is similar to that of FIG. 1 and like components are designated with like reference numerals. The major difference from the apparatus of FIG. 1 is that the cooling bath 10 is movable longitudinally of the extruded cable 9. The cooling bath 10 is mounted on a track (not shown) and driven by means of a motor 30 connected to the bath via line 31. The microprocessor 13 is in communication with the cooling drive motor 30 by means of lines 32 and 33. A capacitance gauge 34 is positioned immediately downstream of the cooling bath 10. The gauge 34 sends information regarding the capacitance of the cable 9 to the microprocessor via line 35.

The apparatus operates in a manner substantially similar to that described above with reference to Figure 1, with the exception that the microprocessor 13 additionally governs the position of the cooling bath 10. A chemical blowing agent, added to the thermoplastics material 7 in the hopper 5, produces a gas on heating which expands the extrudate into a foamed construction. The extrudate is stabilized by cooling in the bath 10 when the expanding foam is "frozen" in position. Signals from the gauge 34, representing the capacitance of the cable 9, are fed to the microprocessor 13 via line 35. The microprocessor accordingly adjusts the position of the bath 10, by means of signals sent to the motor 30, in order to maintain the capacitance of the cable substantially constant.

As the weight/meter of extrudate on the cable is maintained substantially constant as hereinbefore described, control of the capacitance of the cable automatically governs the other important parameter, the diameter of the cable. There is accordingly no necessity to independently measure the diameter of the cable. Indeed known control systems which attempt separate control of both diameter and electrical capacitance often lead to conflict within the controlling mechanism resulting in instability and an unreliable extrusion line.

It will be appreciated that in an alternative embodiment the capacitance gauge 34 can be replaced with an optical diameter gauge which is then used to supply signals for the microprocessor to control the position of the cooling bath 10. In a similar manner it will be appreciated that various methods of controlling the temperature profile of the cooling extrudate may be employed. In addition to cooling baths, troughs or jets, the microprocessor may directly control heating means within the extruder in order to adjust the temperature at which the extrudate leaves the barrel 2.

We claim:
1. A method of controlling an extrusion process comprising the steps of feeding the material to be extruded from a supply station to an extruder;
   repeatedly weighing the supply station to calculate the throughput of the extruder, the frequency of the weighing being independent of line speed;
   calculating an initial line speed necessary to produce a predetermined weight/meter of extrudate;

adjusting the line speed directly to said initial line speed;

subsequently increasing the throughput of the extruder and the line speed simultaneously, such that the weight/meter of the extrudate is maintained substantially constant, until any one of a plurality of measured parameters reaches a predetermined maximum value; and thereafter adjusting the line speed or extruder throughput in response to the calculated throughput of the extruder such as to maintain the weight/meter of the extrudate substantially constant at said predetermined weight/meter.

2. A method according to claim 1 wherein the throughput of the extruder and the line speed are simultaneously increased in an incremental manner, separated by periods in which only one of the throughput or line speed is varied such as to maintain the weight/meter of the extrudate substantially at the predetermined weight/meter.

3. A method according to claim 2 wherein each increment is preset to subsist for a predetermined time period.

4. A method according to claim 1 including the additional step of reducing the extruder throughput and the line speed, once at least one of said measured parameters has reached its predetermined maximum value, until said at least one parameter again falls below the predetermined maximum value.

5. A method according to claim 1 wherein the extrudate is a variable density extrudate which is stabilized by cooling the extrudate, the method including the steps of measuring one additional parameter which is either a suitable dimension or the capacitance of the stabilized extrudate, and adjusting the temperature profile of the extrudate in response to said measured additional parameter in order to maintain said additional parameter substantially constant.

6. A method according to claim 5 wherein the suitable dimension is the diameter of the extrudate.

7. A method according to claim 5 wherein the temperature profile of the extrudate is adjusted by changing the longitudinal position of a cooling means, adapted to stabilize the extrudate.

8. A method of controlling an extrusion process comprising the steps of containing a stock of material to be extruded at a supply station;

feeding the material to be extruded from the supply station to an extruder;

repeatedly weighing the supply station to calculate the throughput of the extruder, the frequency of the weighing being independent of line speed;

calculating an initial line speed necessary to produce a predetermined weight/meter of extrudate;

adjusting the line speed directly to said initial line speed;

subsequently increasing the throughput of the extruder and the line speed simultaneously, such that the weight/meter of the extrudate is maintained substantially constant, until any one of a plurality of measured parameters reaches a predetermined maximum value; and thereafter adjusting the line speed or extrudate throughput in response to the calculated throughput of the extruder to maintain the weight/meter of the extrudate substantially constant at said predetermined weight/meter.

* * * * *